United States Patent
Pascal et al.

(10) Patent No.: US 12,521,918 B2
(45) Date of Patent: Jan. 13, 2026

(54) METHOD FOR MANUFACTURING A PRODUCT MADE FROM POLYARYLETHERKETONE AND CORRESPONDING PRODUCT

(71) Applicant: ARKEMA FRANCE, Colombes (FR)

(72) Inventors: Jérôme Pascal, Serquigny (FR); Yves Deyrail, Serquigny (FR); Philippe Bussi, Colombes (FR); Clément Paul, Serquigny (FR)

(73) Assignee: ARKEMA FRANCE, Puteaux (FR)

( * ) Notice: Subject to any disclaimer, the term of this patent is extended or adjusted under 35 U.S.C. 154(b) by 398 days.

(21) Appl. No.: 17/790,197

(22) PCT Filed: Dec. 18, 2020

(86) PCT No.: PCT/FR2020/052565
§ 371 (c)(1),
(2) Date: Jun. 30, 2022

(87) PCT Pub. No.: WO2021/136904
PCT Pub. Date: Jul. 8, 2021

(65) Prior Publication Data
US 2023/0089774 A1    Mar. 23, 2023

(30) Foreign Application Priority Data
Dec. 31, 2019    (FR) ...................... 1915791

(51) Int. Cl.
*B29C 43/00*    (2006.01)
*B29C 43/52*    (2006.01)
(Continued)

(52) U.S. Cl.
CPC ............ *B29C 43/003* (2013.01); *B29C 43/52* (2013.01); *C08G 65/4012* (2013.01);
(Continued)

(58) Field of Classification Search
CPC ... B29C 43/003; B29C 43/52; B29K 2071/00; B29K 2995/004; B29K 2995/0041
(Continued)

(56) References Cited

U.S. PATENT DOCUMENTS

2006/0251878 A1* 11/2006 Meakin .................... C08G 8/02
428/292.1
2010/0113688 A1    5/2010 Hsu et al.
(Continued)

FOREIGN PATENT DOCUMENTS

| EP | 2776224 A1 | 9/2014 |
| FR | 3070979 A1 | 3/2019 |

OTHER PUBLICATIONS

International Search Report (PCT/ISA/210) with translation and Written Opinion (PCT/ISA/237) mailed on Apr. 28, 2021, by the European Patent Office as the International Searching Authority for International Application No. PCT/FR2020/052565. (11 pages).

*Primary Examiner* — Christina A Johnson
*Assistant Examiner* — Xue H Liu
(74) *Attorney, Agent, or Firm* — Boone IP Law (57) ABSTRACT

A process including: the provision of a semicrystalline or crystallizable composition, having a glass transition temperature $T_g$, including at least one polyaryletherketone; the provision of a compression forming means including: a mold, the mold having at least one cavity; the preparation of the composition in the molten state in said at least one cavity, the mold having a temperature $T_0$ at the end of the preparation stage; the compression and the cooling of the composition in the molten state, the mold being cooled from the temperature $T_0$ down to a final temperature $T_f$ of less than or equal to $(T_g+30)°$ C., to form a compression-formed article;
(Continued)

and the removal of the compression-formed article from the mold; in which the composition has a melting point strictly of less than 340° C.

18 Claims, 1 Drawing Sheet

(51) Int. Cl.
*C08G 65/40* (2006.01)
*B29K 71/00* (2006.01)

(52) U.S. Cl.
CPC .... *B29K 2071/00* (2013.01); *B29K 2995/004* (2013.01); *B29K 2995/0041* (2013.01); *C08G 2250/00* (2013.01); *C08G 2650/40* (2013.01)

(58) Field of Classification Search
USPC .................................................. 264/331.11
See application file for complete search history.

(56) References Cited

U.S. PATENT DOCUMENTS

| | | |
|---|---|---|
| 2018/0208741 A1 | 7/2018 | Le et al. |
| 2019/0283346 A1* | 9/2019 | Le Meur ............... B29C 51/004 |
| 2020/0172670 A1 | 6/2020 | Brule et al. |
| 2021/0129386 A1 | 5/2021 | Mathieu et al. |

* cited by examiner

METHOD FOR MANUFACTURING A PRODUCT MADE FROM POLYARYLETHERKETONE AND CORRESPONDING PRODUCT

TECHNICAL FIELD

The invention relates to the field of processes for the compression forming of thermoplastics.

More particularly, the invention relates to a process for the forming of a composition comprising at least one polyaryletherketone.

PRIOR ART

Compression molding is a method for the forming of thermoplastic polymers well known to a person skilled in the art. The general information given below comes from Rosato, Dominick V., Rosato, Donald V., and Rosato, Matthew V., Plastic Product Material and Process Selection Handbook, Elsevier, 2004.

In a compression molding process, a polymer is transformed into a product of simple form, by heating and application of pressure by virtue of a press, in a mold having at least one cavity of predefined form.

The mold generally consists of two parts. A female part, or cavity of the mold, is generally mounted on the lower plate of the press, while a male part, or plunger, adapted to match the form of the female part, is fixed on an upper plate of the press.

A compression molding cycle generally comprises the following stages:

1—the mold, open, is charged with thermoplastic polymer in the solid state;

2—the mold is closed by bringing the plunger against the cavity by virtue of the press;

3—the thermoplastic polymer is melted in the closed mold;

4—pressure is applied to the molten thermoplastic polymer;

5—the molten thermoplastic under pressure is cooled to form a compression-molded article;

6—the compression-molded article is withdrawn from the mold (removal from the mold).

Polyaryletherketones are high-performance engineering polymers also known by a person skilled in the art. They can be used for applications which are restrictive in terms of temperature and/or in terms of mechanical constraints, indeed even chemical constraints. They can also be used for applications requiring excellent fire resistance and little emission of fumes and other toxic gases. Finally, they exhibit good biocompatibility. These polymers are found in fields as varied as the aeronautical and aerospace sector, offshore drilling, motor vehicles, the railroad sector, the marine sector, the wind power sector, sport, construction, electronics or medical implants.

The compression molding of polyaryletherketone has to date been carried out only with a polyetheretherketone, the phenylene groups of which are all of 1,4-phenylene type. This polyetheretherketone has a melting point equal to 340° C. or more, measured by the standard ASTM D3418. In the process using this polymer, the mold must be heated to a temperature of 400° C. or more in order for the polyetheretherketone to be able to correctly melt. A temperature stationary phase of sufficient duration is observed at 400° C. so that the melt has in particular a virtually homogeneous temperature. The mold is subsequently cooled and a high pressure, for example a pressure of 150 bars, is applied to the mold throughout the cooling stage, until the temperature of the mold reaches a temperature lower than or equal to 150° C. The article obtained is then removed from the mold at ambient temperature.

This process using a polyetheretherketone, the phenylene groups of which are all of 1,4-phenylene type, exhibits several disadvantages.

It requires maintaining the molten polymer at a very high temperature (around 400° C.) for a long duration (end of the heating stage, temperature stationary phase for homogenization, and start of the compression-cooling stage). This can generate a phenomenon of thermal oxidation of the polymer, which is led to degrade. The article obtained consequently exhibits lesser mechanical properties than those expected and/or a modification in color compared to the initial polymer of yellowing type and/or nonhomogeneities in color.

In addition, the process requires cooling over a wide temperature range (temperature range of the order of 250° C.). This wide range in cooling temperatures implies a risk of poor control of the temperature within the component being cooled (for example a high temperature gradient between the core and the periphery), which increases the possibility of generating residual mechanical stresses. In addition, due to the wide temperature range, the cooling stage is generally very long. In order for this stage not to be too long for industrial use, it may be desired to accelerate the cooling rate, which risks generating more residual mechanical stresses in the structure of the molded article.

There thus exists a need to provide improved processes for the compression forming of polyaryletherketone(s), intended for applications which are restrictive in terms of temperature and/or in terms of mechanical constraints, indeed even chemical constraints.

OBJECTIVES OF THE INVENTION

An objective of the invention is to provide an improved process for the compression forming of polyaryletherketone (s).

According to certain embodiments at least, one objective is to provide a process making it possible to obtain an article having good mechanical properties and/or few residual mechanical stresses.

According to certain embodiments at least, one objective is to provide a process making it possible to obtain an article having a homogeneous color.

According to certain embodiments at least, one objective is to provide a process making it possible to obtain an article having a high thickness.

According to certain embodiments at least, one objective is to provide a process making it possible to obtain a semicrystalline article.

According to certain embodiments at least, one objective is to provide a process which is faster.

PRESENTATION OF THE INVENTION

The present invention relates to a process for the manufacture of an article by compression forming, comprising:

the provision of a semicrystalline or crystallizable composition comprising at least one polyaryletherketone, said composition having a glass transition temperature $T_g$ and a melting point $T_m$;

the provision of a compression forming means comprising: a mold and a means of compression of the mold, the mold having at least one cavity and at least one removable wall capable of closing said at least one cavity, the means of compression being capable of exerting a pressure on at least said removable wall;

the preparation of the composition in the molten state in said at least one cavity, the mold having a temperature $T_0$ at the end of the preparation stage;

the compression and the cooling of the composition in the molten state in said at least one cavity, the mold being cooled from the temperature $T_0$ down to a final temperature $T_f$ of less than or equal to $(T_g+30)°$ C., to form a compression-formed article; and the removal of the compression-formed article from the mold;

in which the composition has a melting point strictly of less than 340° C. and preferably of less than or equal to 335° C.

In some embodiments, the composition has a glass transition temperature $T_g$ strictly of greater than 145° C., preferably of greater than or equal to 150° C.

In some embodiments, the melt flow index of the composition has a value ranging from 1 to 100 cm³/10 min and preferentially has a value ranging from 2 to 60 cm³/10 min, at 380° C. and under a load of 5 kg.

In some embodiments, the cooling in the "compressing and cooling" stage takes place at a mean rate of: 0.25° C./min to 2.5° C./min and preferentially at a mean rate of: 0.5° C./min to 2° C./min between $T_0$ and $T_f$.

In some embodiments, the composition has an isothermal crystallization half-time at a temperature of $(T_m-20)°$ C. of greater than or equal to 5 minutes, preferentially of greater than or equal to 10 minutes and more preferably still of greater than or equal to 15 minutes.

In some embodiments, said at least one polyaryletherketone of the composition represents at least 60%, or at least 70%, or at least 80%, or at least 85%, or at least 90%, or at least 92.5%, or at least 95%, or at least 97.5%, or at least 98%, or at least 98.5%, or at least 99%, or at least 99.5%, or 100% by weight, with respect to the total composition weight.

In some embodiments, said at least one polyaryletherketone is a polyetherketoneketone.

According to a first alternative form, said polyetherketoneketone is a copolymer consisting essentially of, preferentially consisting of:

a terephthalic unit and an isophthalic unit, the terephthalic unit having the formula:

[Chem 1]

(I)

the isophthalic unit having the formula:

[Chem 2]

(II)

the molar percentage of terephthalic unit, with respect to the sum of the isophthalic and terephthalic units, being from 45% to 75%, preferentially from 48% to 72%, more preferably from 54% to 66% and extremely preferably from 58% to 64%.

According to a second alternative form, said at least one polyaryletherketone is a copolymer comprising a unit of formula:

[Chem 3]

(III)

and a unit of formula:

[Chem 4]

(IV)

the molar percentage of unit (III), with respect to the sum of the units (III) and (IV), being from: 55% to 95% and preferentially from: 60% to 85%.

According to a third alternative form, said at least one polyaryletherketone is a copolymer comprising a unit of formula:

[Chem 5]

(III)

and a unit of formula:

[Chem 6]

(V)

the molar percentage of unit (III), with respect to the sum of the units (III) and (V), being from: 0% to 95%, preferentially from: 40% to 95% and more preferentially from: 70% to 95%.

In some embodiments, the composition is provided in the form of granules.

In other embodiments, the composition is provided in the form of a powder having a distribution in diameters of particles having a D50 of less than or equal to 500 microns, preferentially of less than or equal to 300 microns, more preferentially of less than or equal to 100 microns and extremely preferentially of approximately 50 microns.

In some embodiments, the preparation of the composition in the molten state in the mold comprises a stage of homogenization of the composition in the molten state, the mold being maintained at a temperature $T_0$ for a sufficient duration of homogenization. The duration of homogenization is advantageously short. According to a first alternative form, the preparation of the composition in the molten state comprises:

the filling of the cavity with said powder, or said granules, and optionally the tamping down of said powder, or respectively of said granules, in the cavity in order to obtain a cavity filled with powder, or respectively filled with granules; and the heating of the mold filled with powder, or respectively with granules, at the temperature $T_0$, with $T_0 \geq (T_m+10)°$ C., in order to melt all of the powder or granules.

According to a second alternative form, the preparation of the composition in the molten state comprises the transfer into the cavity of the premelted composition, the mold being maintained at the temperature $T_0$, with $T_0 \leq T_m$, in order to obtain a mold filled with composition in the molten state.

In some embodiments, the process also comprises a stage of annealing the compression-formed article, in order to remove any residual stress.

The present invention also relates to an article capable of being obtained by the process described here.

According to some embodiments, the article can have a thickness of greater than or equal to 75 millimeters.

According to some embodiments, the article can have an enthalpy of fusion of greater than or equal to 25 J/g (PAEK), preferentially of greater than or equal to 30 J/g (PAEK), more preferentially of greater than or equal to 35 J/g (PAEK), as measured by DSC in first heating with a heating gradient of 20° C./min.

The present invention makes it possible to overcome the disadvantages of the prior art. It more particularly provides a process in which the thermal oxidation phenomena are limited as a result of the lower melting point(s) of the PAEK(s) used. This is because the maximum temperature to which the composition comprising at least one PAEK is subjected during the process is substantially lower than that of the processes according to the prior art. In addition, the range of cooling temperatures is reduced, which implies a "compression and cooling" stage which is generally faster and less likely to generate residual mechanical stresses within the formed article.

The preferential embodiments make it possible in particular to further reduce the maximum temperature reached during the process, and/or to reduce the duration during which the composition is subjected to high temperatures (in particular temperatures close to the maximum temperature), and/or to reduce the duration of the compression and cooling stage, and/or to promote homogeneous crystallization during the "compression and cooling" stage while generating a minimum of stresses.

The process according to the invention and/or the processes according to the preferred embodiments thus make it possible to obtain compression-formed articles having good mechanical properties and/or a sufficiently homogeneous color and/or a high and sufficiently homogeneous degree of crystallinity and/or a high thickness.

DETAILED DESCRIPTION OF THE INVENTION

The invention will now be described in more detail and in a nonlimiting manner in the detailed description which follows.

DEFINITIONS

The term "glass transition temperature", denoted $T_g$, is understood to designate the temperature at which an at least partially amorphous polymer passes from a rubbery state to a glassy state, or vice versa, as measured by differential scanning calorimetry (DSC) in second heating using a heating rate of 20° C./min, according to the standard ISO 11357-2:2013. In the present invention, when reference is made to a glass transition temperature, it is more particularly, unless otherwise indicated, the glass transition temperature at stationary phase half-height, as defined in this standard. The compositions comprising one or more PAEK (s) may possibly exhibit several glass transition stationary phases in the DSC analysis, in particular due to the presence of several PAEKs having different glass transition temperatures. In this case, the term "glass transition temperature" is understood to mean the glass transition temperature corresponding to the glass transition stationary phase which is lowest in temperature.

The term "melting point", denoted $T_m$, is understood to designate the temperature at which an at least partially crystalline polymer changes to the viscous liquid state, as measured by differential scanning calorimetry (DSC) in second heating with a heating rate of 20° C./min, according to the standard ISO 11357-3:2018. In the cases where a melting point cannot be measured by this method, in particular for compositions which may crystallize more slowly, the composition is first heated at a temperature greater by a few tens of degrees above its $T_g$, for example at a temperature of: $(T_g+90)°$ C., for several tens of minutes, for example for 60 minutes, then heated according to a gradient of 20° C./min.

In the present invention, when reference is made to a melting point, it is more particularly, unless otherwise indicated, the peak melting point as defined in this standard. The powders based on PAEK(s) in the present invention may possibly exhibit several melting peaks in the DSC analysis, in particular due to the presence of different crystalline forms for a given PAEK and/or due to the presence of several different PAEKs. In this case, the term "melting point of the powder" is understood to mean the melting point corresponding to the melting peak highest in temperature.

The term "semicrystalline" is understood to denote a composition which exhibits, at a temperature under consideration, one or more crystalline regions, which is observable by X-rays.

The term "crystallizable" is understood to denote a composition, initially essentially amorphous at an initial temperature, for example at ambient temperature, capable of forming one or more semicrystalline regions when it is subjected to a heat treatment above its $T_g$ for a sufficient duration.

A composition is considered to be semicrystalline or crystallizable if its enthalpy of fusion is greater than or equal to 1 J/g, preferentially greater than or equal to 2 J/g and more preferentially greater than or equal to 5 J/g, as measured by differential scanning calorimetry (DSC) in second heating with a heating rate of 20° C./min, according to the standard ISO 11357-3:2018. In the cases where the enthalpy of fusion appears to be strictly less than 1 J/g according to the abovementioned method, in particular for compositions which may crystallize more slowly, the composition is first heated at a temperature greater by a few tens of degrees above its $T_g$, for example at $T_g+90°$ C., for several tens of minutes, for example for 60 minutes, then heated according to a gradient of 20° C./min. A composition is considered to be semicrystalline or crystallizable if its enthalpy of fusion is greater than or equal to 1 J/g, preferentially greater than or equal to 2 J/g and more preferentially greater than or equal to 5 J/g, as measured according to this second method.

The term "isothermal crystallization half-time", denoted "$t_{1/2}$", at a measurement temperature, is understood to designate the time required to reach a relative crystallinity of 0.5 for an isothermal crystallization at the measurement temperature, as defined according to the standard ISO 11357-7:2015.

The term "mixture of polymers" is understood to denote a macroscopically homogeneous composition of polymers. The term also encompasses such compositions composed of mutually immiscible phases dispersed at the micrometric scale.

The term "copolymer" is understood to denote a polymer resulting from the copolymerization of at least two types of monomers which are chemically different, referred to as comonomers. A copolymer is thus formed of at least two different repeat units. It can also be formed of three or more repeat units.

The acronym "PAEK" corresponds to the notation "polyaryletherketone", "PAEKs" to "polyaryletherketones" and "PAEK(s)" to "polyaryletherketone(s)".

Composition Used

The composition comprises at least one polyaryletherketone. A polyaryletherketone (PAEK) comprises the units of following formulae:

$$(-Ar-X-) \text{ and } (-Ar_1-Y-),\quad\quad [\text{Chem 7}]$$

in which:
Ar and $Ar_1$ each denote a divalent aromatic radical;
Ar and $Ar_1$ can preferably be chosen from 1,3-phenylene, 1,4-phenylene, 1,1'-biphenylene divalent in positions 3,3', 1,1'-biphenyl divalent in positions 3,4', 1,4-naphthylene, 1,5-naphthylene and 2,6-naphthylene;
X denotes an electron-withdrawing group; it can preferably be chosen from the carbonyl group and the sulfonyl group;
Y denotes a group chosen from an oxygen atom, a sulfur atom or an alkylene group, such as —$(CH)_2$— and isopropylidene.

In these units X and Y, at least 50%, preferably at least 70% and more particularly at least 80% of the X groups are a carbonyl group, and at least 50%, preferably at least 70% and more particularly at least 80% of the Y groups represent an oxygen atom.

According to a preferred embodiment, 100% of the X groups denote a carbonyl group and 100% of the Y groups represent an oxygen atom.

The weight of PAEK or, if appropriate, the sum of the weights of the PAEKs of the composition generally represents at least 50% of the total weight of the composition. It can in particular represent at least 60%, or at least 70%, or at least 80%, or at least 85%, or at least 90%, or at least 92.5%, or at least 95% of the total weight of the composition.

In some embodiments, the composition consists essentially of PAEK(s), that is to say that it comprises from 95% to 99.9% of the total weight of the composition as PAEK(s).

In some embodiments, the composition consists of PAEK(s), that is to say that it consists of at least 99.9%, ideally of 100%, of the total weight of the composition as PAEK(s).

The composition has a melting point, $T_m$, strictly of less than 340° C. Preferably, the composition can have a melting point of less than or equal to 335° C.

In some embodiments, the composition has a melting point of less than or equal to 330° C., or of less than or equal to 320° C., or of less than or equal to 310° C., indeed even of less than or equal to 305° C. Generally, the lower the melting point of the composition, the less the composition will be subject to thermal oxidation phenomena, the effect of which is detrimental to the article obtained at the end of the process. This is because a composition having a low melting point will generally be subjected to lower temperatures (in particular a lower maximum temperature during the process) than a composition having a higher melting point. Nevertheless, for uses of the articles manufactured according to the invention under conditions which are restrictive in terms of temperatures, a melting point which is too low, for example a melting point of less than or equal to 250° C., is generally not desired.

The composition can have a melt flow index at 380° C. and under a load of 5 kg of: 1 to 100 cm³/10 min, as measured according to the standard ASTM D1238-10. The composition can preferentially have a melt flow index of 2 to 60 cm³/10 min. Compositions having an excessively low viscosity index can have difficulty flowing when molten, making the filling of the cavity and/or the homogenization of the composition in the molten state in the cavity more difficult to implement. In unfavorable situations (in particular due to an excessively high viscosity and insufficient homogenization), an article exhibiting porosities can be obtained (undesired). As regards compositions having an excessively high viscosity index, it is generally more difficult to ensure good sealing of the mold once a pressure is exerted on the composition in the molten state.

The composition can have a glass transition temperature, $T_g$, of greater than or equal to 125° C. A high glass transition temperature value makes it possible to envisage uses of the articles manufactured according to the invention under restrictive conditions in terms of temperature. The glass transition temperature can in particular be greater than or equal to 130° C., or greater than or equal to 140° C., or greater than or equal to 145° C., or greater than or equal to 150° C., indeed even greater than or equal to 155° C.

The difference ($T_m-T_g$) is advantageously as low as possible so that the cooling during the process is as short as possible. The difference ($T_m-T_g$) is preferentially strictly less than 190° C.

The difference ($T_m-T_g$) can in particular be less than or equal at 185° C., or less than or equal to 180° C., or less than or equal to 170° C., or less than or equal to 160° C., indeed even less than or equal to 150° C.

The composition can have an isothermal crystallization half-time at a temperature of $(T_m-20)°$ C. of greater than or equal to 5 minutes, preferentially of greater than or equal to 10 minutes and more preferentially still of greater than or equal to 15 minutes.

The composition can have an isothermal crystallization half-time at a temperature of $(T_m-40)°$ C. of greater than or equal to 5 minutes, preferentially of greater than or equal to 10 minutes and more preferentially still of greater than or equal to 15 minutes.

These isothermal crystallization half-times are particularly advantageous in embodiments, some of which are detailed below, where it is desired for the composition not to crystallize too quickly (for example: melting of composition granules initially in the amorphous state in a process of molding by compression of granules, or else introduction of molten composition into a mold maintained at a temperature $T_0 \leq T_m$ in an extrusion-compression process). However, in order for the composition to be able to crystallize sufficiently during the compression and cooling stage, the composition advantageously has an isothermal crystallization half-time, at the temperature for which the rate of crystallization is at a maximum, which is sufficiently low with respect to the total duration of the compression and cooling stage.

In some embodiments, the composition comprises, or consists essentially of, or consists of, a single PAEK.

In other embodiments, the composition comprises, or consists essentially of, or consists of, several PAEKs.

Advantageously, the PAEK(s) can be chosen from:

a polyetherketoneketone: it comprises one or more unit(s) of formula: -Ph-O-Ph-C(O)-Ph-C(O)—;

a polyetheretherketone: a PEEK comprises one or more unit(s) of formula: -Ph-O-Ph-O-Ph-C(O)—;

a polyetherketone, also known as PEK; a PEK comprises one or more unit(s) of formula: -Ph-O-Ph-C(O)—;

a polyetheretherketoneketone, also known as PEEKK; a PEEKK comprises one or more unit(s) of formula: -Ph-O-Ph-O-Ph-C(O)-Ph-C(O)—;

a polyetheretheretherketone, also known as PEEEK; a PEEEK comprises one or more unit(s) of formula: -Ph-O-Ph-O-Ph-O-Ph-C(O)—;

a polyetherdiphenyletherketone, also known as PEDEK; a PEDEK comprises one or more unit(s) of formula -Ph-O-Ph-Ph-O-Ph-C(O)—;

their mixtures; and their copolymers, in which: Ph represents a phenylene group and —C(O)— represents a carbonyl group, it being possible for each of the phenylenes independently to be of ortho (1,2), meta (1,3) or para (1,4) type, preferentially being of meta or para type.

In addition, defects, end groups and/or monomers can be incorporated in a very small amount in the polymers as described in the above list, without, however, having an effect on their performance.

According to a first alternative form, the composition consists essentially of, indeed even consists of, a polyetherketoneketone copolymer comprising:

a terephthalic unit and an isophthalic unit, the terephthalic unit having the formula:

[Chem 8]

(I)

the isophthalic unit having the formula:

[Chem 9]

(II)

For a copolymer, the term "comprises one or more unit(s)" is understood to mean that this/these unit(s) have a molar proportion of at least 50% in the copolymer. This/these unit(s) can represent a molar proportion of at least 60%, or of at least 70%, or of at least 80%, or of at least 85%, or of at least 90%, or of at least 92.5%, or of at least 95% in the copolymer. The term "consists essentially of unit(s)" is understood to mean that the unit(s) represent(s) a molar proportion of 95% to 99.9% in the copolymer. Finally, the term "consists of unit(s)" is understood to mean that the unit(s) represent(s) a molar proportion of at least 99.9% in the copolymer.

Preferably, the polyetherketoneketone consists essentially of, indeed even consists of: isophthalic "I" and terephthalic "T" units. The choice of the molar proportion of T units, with respect to the sum of the T and I units, is one of the factors which makes it possible to adjust the melting point and the rate of crystallization properties of the polyetherketoneketones. A given molar proportion of T units, with respect to the sum of the T and I units, can be obtained by adjusting the respective concentrations of the reactants during the polymerization, in a way known per se.

The molar proportion of T units, with respect to the sum of the T and I units, of PEKK(s) can vary from: 0 to 5%; or from 5% to 10%; or from 10% to 15%; or from 15% to 20%; or from 15% to 20%; or from 20% to 25%; or from 25% to 30%; or from 30% to 35%; or from 35% to 40%; or from 40% to 45%; or from 45% to 48%; or from 48% to 54%; or from 54% to 60%; or from 60% to 66%; or from 66% to 72%; or from 72% to 75%; or from 75% to 80%; or from 80% to 85%; or from 85% to 90%; or from 90% to 95%; or from 95% to 100%.

Advantageously, the composition consists essentially of, indeed even consists of, a polyetherketoneketone consisting essentially of, indeed even consisting of, "T" and "I" units, with a molar proportion of T units, with respect to the sum of the T and I units, ranging from 45% to 75%. This is because, in this range of molar proportions, a polyetherketoneketone has a melting point strictly of less than 340° C. and suitable crystallization rates between $T_g$ and $T_m$ for use in a process according to the invention. The molar proportion of T units, with respect to the sum of the T and I units, is preferentially from 48% to 72%, more preferably from 54% to 66%, extremely preferably from 58% to 64%. The molar proportion of T units, with respect to the sum of the T and I units, can in particular be approximately 60%.

According to a second alternative form and a third alternative form, which are presented below, the composition consists essentially of polyetheretherketone constituent unit comprising only 1,4-phenylene groups with another repeat unit, making it possible to adjust the values of $T_g$, $T_m$ and crystallization rates between $T_g$ and $T_m$, with respect to a polyetherketoneketone homopolymer comprising only 1,4-phenylene groups.

According to the second alternative form, the composition consists essentially of, indeed even consists of, a copolymer comprising a unit of formula:

[Chem 10]

(III)

and a unit of formula:

[Chem 11]

(IV)

Preferentially, the copolymer consists essentially of, indeed even consists of: units of formulae (III) and (IV).

Advantageously, the composition consists essentially of, indeed even consists of, a copolymer consisting essentially of, indeed even consisting of, units of formulae (III) and (IV) and having a molar proportion of (III) units, with respect to the sum of the (III) and (IV) units, ranging from: 55% to 95%. The molar proportion of (III) units, with respect to the sum of the (III) and (IV) units, is preferentially from: 60% to 85%, and more preferentially from: 65% to 75%.

The molar proportion of (III) units, with respect to the sum of the (III) and (IV) units, can in particular be approximately 70%.

According to the third alternative form, the composition consists essentially of, indeed even consists of, a copolymer comprising a unit of formula:

[Chem 12]

(III)

and a unit of formula:

[Chem 13]

(V)

Preferentially, the copolymer consists essentially of, indeed even consists of: units of formulae (III) and (V).

Advantageously, the composition consists essentially of, indeed even consists of, a copolymer consisting essentially of, indeed even consisting of, units of formulae (III) and (V) and having a molar proportion of (III) units, with respect to the sum of the (III) and (V) units, ranging from 0% to 95%. The molar proportion of (III) units, with respect to the sum of the (III) and (V) units, is preferentially from 5% to 95%, more preferably from 40% to 95% and extremely preferentially from 70% to 95%. The molar proportion of (III) units, with respect to the sum of the (III) and (V) units, can in particular be from: 70% to 75%, or from 75% to 80%, or from 80% to 85%, or from 85% to 90%, or also from 90% to 95%.

According to some embodiments, the composition can additionally contain one or more other polymers not belonging to the family of the PAEKs, in particular other thermoplastic polymers.

According to some embodiments, the composition can additionally comprise fillers and/or additives.

Mention be made, among the fillers, of reinforcing fillers, in particular inorganic fillers, such as: talc, carbon black, carbon or non-carbon nanotubes, fibers (glass, carbon, and the like), which are or are not ground. The composition can thus comprise less than 50% by weight of fillers, preferably less than 40% by weight of fillers and more preferably less than 25% by weight of fillers, with respect to the total weight of the composition.

Mention may be made, among the additives, of stabilizing agents (light, in particular UV, and heat stabilizing agents, such as, for example, phosphate salts), optical brighteners, dyes, pigments, flow agents, additives making it possible to adjust the viscosity of the composition in the molten state, the additives making it possible to adjust the crystallization rates of the composition between $T_g$ and $T_m$, additives making it possible to adjust the heat capacity of the composition, or a combination of these additives. The composition can thus comprise less than 10% by weight, preferably less than 5% by weight and more preferably less than 1% by weight of additive(s), with respect to the total weight of the composition.

The composition can be provided in the form of granules. The granules generally have a characteristic size of the order of 1 to 5 millimeters and can be obtained by compounding. The advantage of compounding is that it makes it possible to formulate a homogeneous composition comprising one or more PAEK(s) and/or to incorporate other constituents, such as fillers and additives, within the granules. The advantage of compounding is also that it makes it possible, according to some embodiments, in particular for PAEKs having crystallization rates between $T_g$ and $T_m$ which are sufficiently low, to obtain a composition in the amorphous form: this can be an advantage in the case of compression molding since this can make it possible, according to some embodiments, to reduce the duration of preparation of the composition in the molten state in the mold (and also the energy costs for melting the composition).

The composition can also be provided in the powder form. A powder can be obtained by methods known per se, such as spray drying, grinding under cryogenic conditions or at ambient temperature, or melt spraying.

In some embodiments, a pure PAEK powder, for example a pure PEKK powder, can be obtained by grinding flakes, that is to say raw material, having irregular shapes, with a characteristic size of the order of a millimeter and with a generally fairly low density. The grinding can be carried out at a temperature of between 0° C. and 50° C., as described in EP 2 776 224. The powder can subsequently undergo a densification stage, as described in EP 3 215 331. This makes it possible to incorporate a minimum volume of air in the cavity during the filling, the air having subsequently advantageously to be removed during a period of homogenization of the melt in the cavity.

The pure PAEK powder can be mixed "dry" (dry blend) with other constituents, such as other thermoplastic polymer(s) or such as fillers and additives.

In other embodiments, a powder of PAEK(s) comprising at least fillers can be obtained by grinding granules.

The powder can have a distribution in diameters of particles with a D50 of less than or equal to 500 microns, preferentially of less than or equal to 300 microns, more preferentially of less than or equal to 100 microns and extremely preferentially of approximately 50 microns. The term "D50" is understood to mean the value of the diameter of the powder particles so that the cumulative function of distribution of the diameters of the particles, weighted by the volume, is equal to 50%. "D50" is measured by laser diffraction according to the standard ISO 13320: 2009, for example on a Malvern Mastersizer 2000® diffractometer.

Compression Forming Process

The manufacturing process according to the invention is a compression forming process. It makes it possible to obtain articles of high thickness.

The method comprises the provision of a semicrystalline or crystallizable composition, as described above. The composition can in particular be provided in the form of granules or in the form of a powder.

The process also comprises the provision of a compression forming means. This forming means comprises a mold and a compression means.

The molds used for the compression forming are well known to a person skilled in the art. They can in particular be of positive, semipositive or also flash type.

They comprise at least one cavity and at least one removable wall capable of closing said at least one cavity. On closing the mold, a gasket can be positioned between the cavity and the removable wall so as to ensure that the closed mold is sealed.

An opening can also be made in the mold in order to make possible the extrusion or the injection molding of composition in the molten state (see embodiment 2).

The mold must be manufactured from materials resistant to high temperatures, to temperature variations, to corrosion and to high pressures.

To facilitate the removal from the mold, a mold-release agent can be applied to the internal walls of the mold.

The compression means of the mold makes it possible to exert a pressure on at least the removable wall of the mold. The compression means can be a press, in particular a press of hydraulic type, or in a more restricted use of pneumatic type.

The mold and/or the compression means can be heated by an electric system (coil, cartridge, tape, and the like), a steam circulation system, an oil circulation system, and the like.

Figure 1:
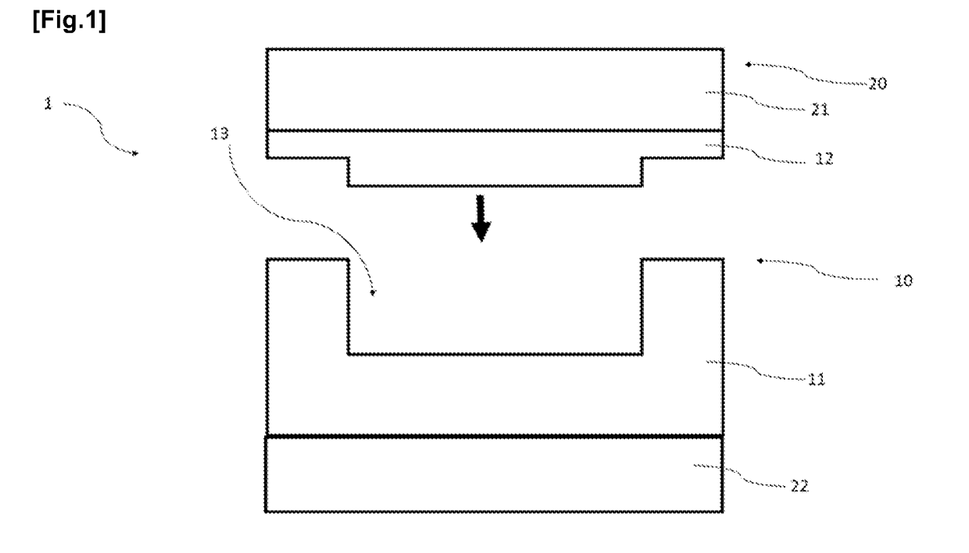
FIG. 1 diagrammatically represents a first alternative form of compression-forming means.

A first compression forming means 1 is represented in a simplified manner in FIG. 1.

It comprises a mold 10, consisting of a first wall 11 of negative form (open cavity) and of a second wall 12, removable, of positive form. The first wall 11 of the mold and the second wall 12 of the mold can be joined so as to form a closed cavity 13. The first wall 11 and the second wall 12 are respectively mounted on an upper plate 21 and a lower plate 22 of a press 20, the first and second plates being capable of being heated. In addition, the first wall 11 of the mold 10 can optionally have heating means available laterally (not represented).

Figure 2:
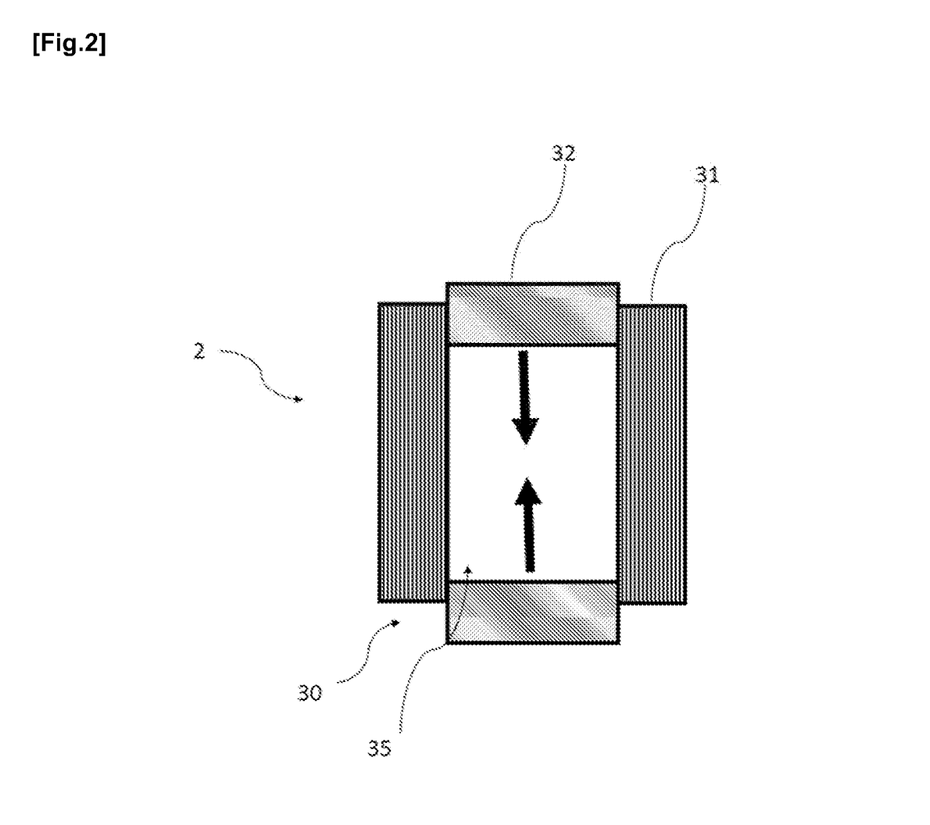
FIG. 2 diagrammatically represents a second alternative form of compression-forming means.

A second compression forming means 2 is represented in a simplified manner in FIG. 2.

It comprises a mold 30 consisting of a ring 31 and of two pistons 32. The ring 31 comprises two openings which can be closed by the pistons 32, so as to form a closed cavity 35. The ring 31 and/or the pistons 32 can have heating means available (not represented).

Embodiment 1: Compression Molding

According to a first embodiment, the process is a process for the compression molding of a composition in the form of granules or in the form of a powder.

The composition is introduced into an open mold so as to fill the cavity thereof up to a predetermined level during a stage of filling the mold.

The composition can optionally be preheated during a preheating stage. The composition can in particular be preheated to a temperature close to its $T_g$, for example a temperature of 150° C.

The preheating stage can in particular make it possible to remove any trace of water in the composition. According to some embodiments, the composition can be preheated under reduced pressure, that is to say at a pressure of less than 1 bar.

The preheating can be carried out before the stage of filling the mold, for example in an air oven, or under infrared radiation and/or on a heated plate. In this case, once the preheating stage is complete, the preheated powder is advantageously rapidly transferred into the mold brought to a temperature substantially equal to the preheating temperature. This makes it possible for the composition to more rapidly reach a homogeneous temperature $T_0$ once the mold is heated to reach a set temperature $T_0$.

Alternatively, the preheating stage can be carried out during and/or after the stage of filling the mold.

After the open mold has been filled to the desired level, it can be closed. A pressure can optionally be exerted on the powder/granules in the mold so as to carry out tamping. Small amounts of powders/granules can then be successively added to the cavity, so as to fill the cavity up to the desired level, everything being again tamped down by the application of a pressure.

The closed mold, optionally preheated, filled with the optionally tamped composition, is subsequently brought to a temperature $T_0$, with $T_0 \geq (T_m+10)°$ C., in order to melt all of the powder or granules. During this stage, a low pressure can be maintained on the mold, for example a pressure of the order of 20 bars.

According to some embodiments, $T_0 \geq (T_m+20)°$ C., or $T_0 \geq (T_m+30)°$ C. In order to limit thermal oxidation, the situation is generally: $T_0 < (T_m+40)°$ C. Once the temperature $T_0$ has been reached, a temperature stationary phase at $T_0$ can be implemented for a variable duration of homogenization. The duration of homogenization makes it possible for the composition in the molten state to be sufficiently homogeneous: complete melting of the composition, sufficiently homogeneous temperature between the core and the parts in contact with the mold, removal of air possibly present in the powder or the granules initially supplied.

The duration of homogenization can in particular be from: 1 minute to 10 hours, preferentially from 1 hour to 5 hours. The duration of homogenization of granules will typically be longer than that of powders, in particular of fine powders (D50=50 microns) and/or of densified powders.

The mold comprising the composition in the molten state, preferentially homogenized, is subsequently compressed and cooled simultaneously during a compression and cooling stage.

The pressure applied to the mold is implemented using the compression means of the mold. Preferentially, the pressure has a value ranging from: 10 to 300 bars.

The pressure can in particular have a value ranging from 10 to 50 bars, or ranging from 50 bars to 100 bars, or ranging from 100 bars to 150 bars, or ranging from 150 bars to 200 bars, or ranging from 200 bars to 250 bars, or ranging from 250 bars to 300 bars.

The pressure applied can be constant during substantially the entire compression and cooling stage. The pressure applied can in particular be constant during at least 75%, or at least 80%, or at least 85%, or at least 90%, or at least 95%, or 100% of the total duration of the compression and cooling stage. The pressure applied is advantageously constant throughout the "compression and cooling" stage.

Alternatively, the pressure applied can be variable during the compression and cooling stage.

The cooling applied in the compression and cooling stage can be implemented by a thermal fluid in contact with the mold and/or by blowing air over the mold.

The mold is cooled from the temperature $T_0$ down to a final temperature $T_f$ of less than or equal to $(T_g+30)°$ C. The mold can in particular be cooled down to a temperature of less than or equal to $(T_g+20)°$ C., or down to a temperature of less than or equal to $(T_g+10)°$ C., or down to a temperature of less than or equal to $T_g$, or down to a temperature of less than or equal to $(T_g-10)°$ C., or also down to a temperature close to ambient temperature.

The cooling preferentially takes place at a mean rate of 0.25° C./min to 2.5° C./min, preferentially at a mean rate of 0.5° C./min to 2° C./min between $T_0$ and $T_f$. The thicker the article being molded, the slower the cooling rate will have to be, since heat transfer to the core of the article takes place solely by thermal convection.

The cooling rate can be constant during substantially the entire "compression and cooling" stage. The cooling rate can in particular be constant during at least 75%, or at least 80%, or at least 85%, or at least 90%, or at least 95%, or 100% of the total duration of the "compression and cooling" stage. The cooling is advantageously carried out at a constant rate of 0.25° C./min to 2.5° C./min, preferentially at a rate of 0.5° C./min to 2° C./min between $T_0$ and $T_f$ during substantially the entire compression and cooling stage.

Alternatively, the cooling rate can be variable during the compression and cooling stage. A cooling profile consisting of temperature gradients as a function of the time and of temperature stationary phases can in particular be envisaged.

At the end of the "compression and cooling" stage, the pressure on the mold is released. An article formed by molding is thus obtained within the cavity.

The formed article is finally removed from the mold at a mold temperature of less than or equal to $T_f$. It can in particular be removed from the mold at the temperature $T_f$, or at a mold temperature of between $T_f$ and ambient temperature, or, if appropriate, at a mold temperature equal to approximately ambient temperature.

The article removed from the mold can subsequently optionally be annealed in order to remove any residual mechanical stress and/or in order to increase the crystallinity thereof. The annealing stage comprises: heating at a rate ranging from 0.1° C. to 20° C./hour up to a temperature greater than or equal to the $T_g$ of the article, a more or less lengthy stationary phase (in particular depending on the thickness of the article) at this stationary phase temperature, then cooling at a rate ranging from 0.1° C. to 20° C./hour. The stationary phase temperature can, for example, be of the order of $(T_g+T_m)/2$.

Embodiment 2: Forming by Extrusion-Compression (or Injection Molding-Compression)

The stage of preparation of the composition in the molten state in the mold can be carried out by extrusion or by injection molding.

In this embodiment, the composition is extruded (or injection molded) in the molten state into the mold cavity, the mold having an initial temperature $T_0 \leq T_m$. For a temperature $T_0$ not excessively lower than $T_m$, it is thus possible to keep a composition in the molten (or supercooled) state throughout the duration of the filling of the cavity. Once the cavity is completely filled with composition in the molten state, a duration of homogenization of the composition in the molten state can be implemented, the mold being maintained at the temperature $T_0$. The duration of homogenization of this embodiment is generally much less than that of embodiment 1.

In order to make possible maintenance in the substantially molten state, without substantially crystallizing, throughout the duration of the filling and/or homogenization stage, the composition used advantageously has an isothermal crystallization half-time at $T_0$ which is sufficiently high from the viewpoint of the abovementioned durations.

According to some embodiments, $T_0 \leq (T_m-5)°$ C., or $T_0 \leq (T_m-10)°$ C., or $T_0 \leq (T_m-20)°$ C., or $T_0 \leq (T_m-25)°$ C., or $T_0 \leq (T_m-30)°$ C., or $T_0 \leq (T_m-35)°$ C., or also $T_0 \leq (T_m-40)°$ C.

The following stages are the same as those described in the embodiment by compression molding of powder/of granules. The mold comprising the composition in the molten state, preferentially homogenized, is subsequently compressed and cooled during a compression and cooling stage, and the like.

The embodiment by forming by extrusion-compression exhibits the advantage that the mold temperature $T_0$ is generally lower than for the embodiment by compression forming of powder or of granules, which makes it possible to further limit the phenomena of thermal oxidation and to further reduce the duration of the compression and cooling stage.

Article

The article obtained by the process according to the invention is generally of simple form. It can be provided in the form of a sheet, in the form of a parallelepiped (in particular a cube or a block) or in the form of a cylinder ("roller") and be used as a semifinished product.

Given the advantages presented by the process according to the invention (in particular lower maximum temperature reached and speed of the compression and cooling stage), relatively high thicknesses can be reasonably envisaged. The article can in particular have a thickness of greater than or equal to 5 mm, or of greater than or equal to 10 mm, or of greater than or equal to 20 mm, or of greater than or equal to 30 mm, or of greater than or equal to 40 mm, or of greater than or equal to 50 mm, or of greater than or equal to 60 mm, or of greater than or equal to 75 mm.

The extrusion-compression or injection molding-compression process (see embodiment 2) makes it possible in particular to obtain thick articles while having a reasonable duration of compression and cooling stage.

The article, which has optionally been subjected to an annealing stage, advantageously has an enthalpy of fusion of greater than or equal to 25 J/g (PAEK), preferentially of greater than or equal to 30 J/g (PAEK) and more preferentially of greater than or equal to 35 J/g (PAEK), as measured in first heating by DSC with a gradient of 20° C./min.

EXAMPLES

Example 1

A pure polyetherketoneketone powder, having a T/I molar ratio of 60:40 and a D50 of 300 micrometers, was used to manufacture a roller (flat cylinder) with a diameter of 240 mm and a thickness of 25 mm, by a powder compression molding process as described in embodiment 1.

The conditions specifically used are described in detail below.

The powder was introduced into the open mold and then tamped down.

It was subsequently dried by heating the mold at 120° C. for 8 hours.

The temperature of the mold was then gradually increased over a duration of 3 h 30, from the temperature of 120° C. until a temperature $T_0$ of 330° C. was reached.

Once the temperature $T_0$ was reached, a temperature stationary phase at $T_0$ with a duration of 4 h 30 was implemented.

The compression and cooling stage was subsequently carried out at a constant cooling rate under a constant pressure of 25 bars. It made it possible to cool the mold from its initial temperature $T_0$ down to a final temperature $T_f$ of 180° C. over a duration of 2 h 05.

The article was removed from the mold at the temperature $T_f$ and then allowed to cool to ambient temperature (25° C.).

The article was finally annealed in an oven. The annealing was carried out by heating according to a gradient of 5° C./hour from a temperature of 25° C. until a stationary phase temperature of 250° C. was reached, maintaining the stationary phase temperature at 250° C. for a few hours, then cooling according to a gradient of 3° C./hour until a temperature of 25° C. was reached.

Example 2

A pure polyetherketoneketone, having a T/I molar ratio of 60:40 and a melt flow index of 16 cm$^3$/10 min (at 380° C. under a load of 5 kg), was used to manufacture a sheet 600 mm long, 240 mm wide and 25 mm thick by an extrusion-compression process, as described in embodiment 2.

The composition was extruded at a temperature of 340° C. into a mold maintained at a temperature $T_0$ of 285° C. The filling of the mold with the extruded composition lasted approximately 10 minutes.

A temperature stationary phase at $T_0$ with a duration of 25 minutes was subsequently implemented.

The compression and cooling stage was carried out at a constant cooling rate under a constant pressure of 250 bars. It made it possible to cool the mold from its initial temperature $T_0$ down to a final temperature $T_f$ of 180° C. over a duration of 2 h 05.

The article was removed from the mold at the temperature $T_f$ and then allowed to cool to ambient temperature (25° C.).

It was subsequently annealed analogously to the article according to example 1. The article, before and after annealing, is ivory in color, which are characteristics of crystalline PEKKs. It exhibits a beautiful visual appearance (homogeneous color).

Example 3

A pure polyetherketoneketone, having a T/I ratio of 70:30 and a melt flow index of 8 cm$^3$/10 min (at 380° C. under a load of 5 kg), was used to manufacture a sheet 600 mm long, 240 mm wide and 25 mm thick by an extrusion-compression process, as described in embodiment 2.

The composition was extruded at a temperature of 385° C. into a mold maintained at a temperature $T_0$ of 325° C. The filling of the mold with the extruded composition lasted approximately 10 minutes.

A temperature stationary phase at $T_0$ with a duration of 25 minutes was subsequently implemented.

The compression and cooling stage was carried out at a constant cooling rate under a constant pressure of 250 bars. It made it possible to cool the mold from its initial temperature $T_0$ down to a final temperature $T_f$ of 180° C. over a duration of 2 h 05.

The article was removed from the mold at the temperature $T_f$ and then allowed to cool to ambient temperature (25° C.).

It was subsequently annealed analogously to the article according to example 1. The article, before and after annealing, is ivory in color, which are characteristics of crystalline PEKKs. It exhibits a beautiful visual appearance (homogeneous color).

Characterization of the Articles Obtained

The articles according to examples 2 and 3 were characterized. Sheet "core" samples (that is to say, samples sufficiently far from the outer edges of the sheet, so as to avoid any edge effect) were taken. Their enthalpy of fusion ΔN, expressed in J/g, was determined by DSC, in first heating with a heating gradient of 20° C./min.

Test specimens of "1A" type, according to the standard ISO 527-2: 2012, were machined in the core of the sheets, then mechanically tested in tension at 23° C. at a crosshead velocity of 50 mm/min. Five test specimens were tested to determine the mean values of:

modulus of elasticity, "E", expressed in GPa;

yield point stress, "$\sigma_{yield}$", expressed in MPa;

yield point strain, "$\varepsilon_{yield}$", expressed in %; and nominal strain at break, "$\varepsilon_{nominal\ break}$", expressed in %.

The results of these characterizations are combined in table 1 below (mechanical properties averaged over 5 samples):

TABLE 1

| | Example 2 | Example 3 |
|---|---|---|
| ΔH (J/g) (mean) | 37 | 42 |
| E (GPa) (mean) | 4.7 | 4.6 |
| $\sigma_{yield}$ (MPa) (mean) | 139 | 135 |
| $\varepsilon_{yield}$ (%) (mean) | 4.5 | 4.5 |
| $\varepsilon_{nominal\ break}$ (%) (mean) | 6.2 | 9.2 |

The invention claimed is:

1. A process for the manufacture of an article by compression forming, comprising:
   providing a semicrystalline or crystallizable composition comprising at least one polyaryletherketone, said composition having a glass transition temperature $T_g$ and a melting point $T_m$;
   providing a compression forming means comprising a mold and a means of compression of the mold, the mold having at least one cavity and at least one removable wall capable of closing said at least one cavity, the means of compression being capable of exerting a pressure on at least said removable wall;
   preparing, in a preparation stage, the composition in a molten state in said at least one cavity, the mold having a temperature $T_0$ at the end of the preparation stage;
   compressing and cooling the composition in the molten state in said at least one cavity, the mold being cooled from the temperature $T_0$ down to a final temperature $T_f$ of less than or equal to $(T_g+30)°$ C., to form a compression-formed article; and
   removing the compression-formed article from the mold;
   in which the composition has a melting point less than 340° C.,
   in which a melt flow index of the composition has a value ranging from 1 to 100 cm³/10 min, at 380° C. and under a load of 5 kg.

2. The process as claimed in claim 1, in which the composition has a glass transition temperature $T_g$ greater than 145° C.

3. The process as claimed in claim 1, in which the cooling in the "compressing and cooling" stage takes place at a mean rate of: 0.25° C./min to 2.5° C./min between $T_0$ and $T_f$.

4. The process as claimed in claim 1, in which the composition has an isothermal crystallization half-time at a temperature of $(T_m-20°$ C.) of greater than or equal to 5 minutes.

5. The process as claimed in claim 1, in which said at least one polyaryletherketone of the composition represents at least 60%, by weight, with respect to a total composition weight.

6. The process as claimed in claim 1, in which said at least one polyaryletherketone is a polyetherketoneketone.

7. The process as claimed in claim 6, in which the said polyetherketoneketone is a copolymer consisting essentially of:
   a terephthalic unit and an isophthalic unit, the terephthalic unit having formula:

[Chem 14]

(I)

the isophthalic unit having formula:

[Chem 15]

(II)

a molar percentage of terephthalic unit, with respect to a sum of the isophthalic and
   terephthalic units, being from 45% to 75%.

8. The process as claimed in claim 1, in which said at least one polyaryletherketone is a copolymer comprising a unit of formula:

[Chem 16]

(III)

and a unit of formula:

[Chem 17]

(IV)

a molar percentage of unit (III), with respect to a sum of the units (III) and (IV), being from: 55% to 95%.

9. The process as claimed in claim 1, in which said at least one polyaryletherketone is a copolymer comprising a unit of formula:

[Chem 18]

(III)

and a unit of formula:

[Chem 19]

(V)

molar percentage of (III) units, with respect to a sum of the (III) and (V) units, being from 0% to 95%.

10. The process as claimed in claim 1, in which the composition is provided in a form of granules.

11. The process as claimed in claim 1, in which the composition is provided in a form of a powder.

12. The process as claimed in claim 10, in which preparing the composition in the molten state comprises:
  filling the cavity with said granules, and optionally tamping down of said granules, in the cavity in order to obtain a cavity filled with said granules; and
  heating the mold filled with granules, at the temperature $T_0$, with $T_0 \geq (T_m + 10° C.)$, in order to melt all of granules.

13. The process as claimed in claim 1, in which preparing the composition in the molten state comprises transferring into the cavity of a premelted composition, the mold being maintained at the temperature $T_0$, with $T_0 \leq T_m$, in order to obtain a mold filled with composition in the molten state.

14. The process as claimed in claim 11, in which preparing the composition in the molten state comprises:
  filling the cavity with said powder and optionally tamping down of said powder in the cavity in order to obtain a cavity filled with powder; and
  heating the mold filled with powder at the temperature $T_0$, with $T_0 \geq (T_m + 10° C.)$, in order to melt all of the powder.

15. The process as claimed in claim 1, wherein the compression-formed article has an enthalpy of fusion of greater than or equal to 25 J/g (PAEK), as measured by DSC in first heating with a heating gradient of 20° C./min.

16. The process according to claim 1, wherein the composition consists of:
  said at least one polyaryletherketone;
  optionally one or several fillers, the filler(s) representing less than 50% by weight with respect to a total weight of the composition, wherein the fillers are selected from the group consisting of talc, carbon black, carbon or non-carbon nanotubes, and fibers; and
  optionally one or several additives, the additive(s) representing less than 10% by weight of the composition, wherein the additives a are selected from the group consisting of stabilizing agents, optical brighteners, dyes, pigments, flow agents, additives making it possible to adjust a viscosity of the composition in the molten state, the additives making it possible to adjust crystallization rates of the composition between $T_g$ and $T_m$, and additives making it possible to adjust a heat capacity of the composition.

17. The process according to claim 16, wherein the fillers represent less than 40% by weight with respect to the total weight of the composition.

18. The process according to claim 16, wherein the fillers represent less than 25% by weight with respect to the total weight of the composition.

* * * * *